United States Patent

[19] Troyer

[11] Patent Number: 6,076,787
[45] Date of Patent: Jun. 20, 2000

[54] PORTABLE STAND FOR LAPTOP COMPUTERS

[75] Inventor: John B. Troyer, Cincinnati, Ohio

[73] Assignee: LapStand, Inc., Cincinnati, Ohio

[21] Appl. No.: 09/188,952

[22] Filed: Nov. 10, 1998

[51] Int. Cl.[7] ............................. F16M 11/38; A47B 97/04
[52] U.S. Cl. ......................... 248/166; 248/460; 248/464; 248/918
[58] Field of Search .................... 248/457, 464, 248/465, 460, 462, 463, 150, 166, 167, 346.3, 165, 434–435, 168–171, 436, 437, 917–918; 108/44

[56] References Cited

U.S. PATENT DOCUMENTS

| | | | |
|---|---|---|---|
| 348,706 | 9/1886 | Weiner | 248/460 |
| 630,231 | 8/1899 | Hudgin | 248/460 |
| 1,059,192 | 4/1913 | Mills | 248/171 |
| 1,856,805 | 5/1932 | Call | 248/166 |
| 2,046,134 | 6/1936 | Ryang | 248/464 |
| 3,804,355 | 4/1974 | Uroshevich | 248/170 |
| 4,854,538 | 8/1989 | Von Schalscha | 248/346.03 |
| 5,121,890 | 6/1992 | Komada | 248/167 |
| 5,242,145 | 9/1993 | Linnell | 248/460 |
| 5,529,322 | 6/1996 | Barton | 248/170 |
| 5,564,661 | 10/1996 | Gershon | 248/167 |
| 5,615,856 | 4/1997 | Simington | 248/463 |
| 5,713,553 | 2/1998 | Cooper | 248/170 |
| 6,006,970 | 12/1999 | Piatt | 224/257 |
| 6,021,720 | 2/2000 | Boos et al. | 108/44 |

*Primary Examiner*—Anita M. King
*Assistant Examiner*—Michael D. Nornberg
*Attorney, Agent, or Firm*—Charles R. Wilson

[57] ABSTRACT

A portable stand for holding a laptop computer is capable of folding to a compact state for storage purposes. The portable stand includes an elongated base member with a pair of base feet to rest on a floor surface, a set of vertically extending post members, and an elongated platform member with a pair of support wings to hold the laptop computer in a position ready for use. The base feet are moveably attached to the elongated base member to swing from a compact position juxtaposed the base member to an extended position at substantially right angles to the base member. The post members are moveably attached to one another, moveably attached to the elongated base member, and moveably attached to the elongated platform member. The base feet and the support wings swing substantially horizontally from the base member and the support member, respectively, while the post members swing substantially vertically relative to one another and to the elongated base and support members. When all the components of the stand are fully extended, a sturdy stand is created which is capable of holding a laptop computer at the proper height and angle for use. When the components are all folded upon themselves, a compact unit is created which easily fits into a carry-case or suitcase for storage purposes.

20 Claims, 11 Drawing Sheets

PORTABLE STAND FOR LAPTOP COMPUTERS

FIELD OF THE INVENTION

This invention relates to a stand for laptop computers. More particularly, the invention relates to a portable laptop computer stand which folds to a compact state for easy storage.

BACKGROUND OF THE INVENTION

Laptop computers have become very popular in recent years. They have a display screen which typically is hinged to a body of the computer. They are light-weight and have a low profile. The screen is simply folded down onto the computer body when not in use. An internal power source often is sufficient for many needs. For more prolonged use, the computer can be plugged into an electric outlet. Various auxiliary devices such as modems and external drives can be connected to the laptop computer to enhance its value to the user.

It is estimated at least about 50,000,000 individuals use a laptop computer on a regular basis. Often, the computers are used in a setting away from a permanent office or home. Business people are the greatest users of laptop computers. The computers can be used while in route, such as on an airplane, in a hotel room or at a customer's business site. They are used for all the purposes any computer is used. They simply provide on-site capability for all computer needs.

Carry-cases have been designed to pack and transport laptop computers. When needed, the computer is unpacked, placed on a support surface of some nature and used. Ideally, the support surface has a flat surface and is stable. The laptop computers, though, are designed to be positioned on the user's lap and used. As readily imagined, the user's lap is not an ideal surface for a computer. A balancing act is required. Also, the user is restricted as to leg movement. Any prolonged computer usage where the computer rests on the user's lap is very tiring.

It is evident to many laptop computer owners that an article is needed which facilitates usage of the computer. Necessarily, the article itself must be light-weight and compact for storage reasons or else the primary benefit of the laptop computer will have been lost. In accord with a demonstrated need, there has now been developed a stand for holding a laptop computer in a steady manner. The stand itself is portable in that it folds upon itself to a compact state which fits into a carry-case or suitcase along with the laptop computer.

SUMMARY OF THE INVENTION

A portable stand for holding a laptop computer is foldable to a compact state for storage purposes. The portable stand includes an elongated base member with a pair of base feet to rest on a floor surface, a set of vertically extending post members, and an elongated platform member with a pair of support wings to hold the laptop computer in a position ready for use. The base feet are moveably attached to the elongated base member to swing from a compact position juxtaposed the base member to an extended position at substantially right angles from the base member to create a floor-engaging foundation. The post members are moveably attached to one another, moveably attached to the elongated base member, and moveably attached to the elongated platform member. The base feet and the support wings swing substantially horizontally from the base member and the platform member, respectively, while the post members swing substantially vertically relative to one another and to the elongated base and platform members. When all the components of the portable stand are fully extended a sturdy stand is created which is capable of holding a laptop computer at the proper height and proper angle for use. When the components are all folded upon themselves, a compact unit is created which easily fits into a carry-case or suitcase for storage purposes.

DETAILED DESCRIPTION OF THE INVENTION

The portable stand of the invention is most useful for holding a laptop computer. The drawings and the description which follows are directed to use of the portable stand with laptop computers. The stand is ideally utilized when the user is seated in a chair. It should be understood the portable stand can be used to hold other articles, e.g. a computer keyboard. The portable stand is also used in other environmental settings. Such usages are contemplated, though, the present emphasis is on laptop computer use while seated in a chair.

Figure 1:
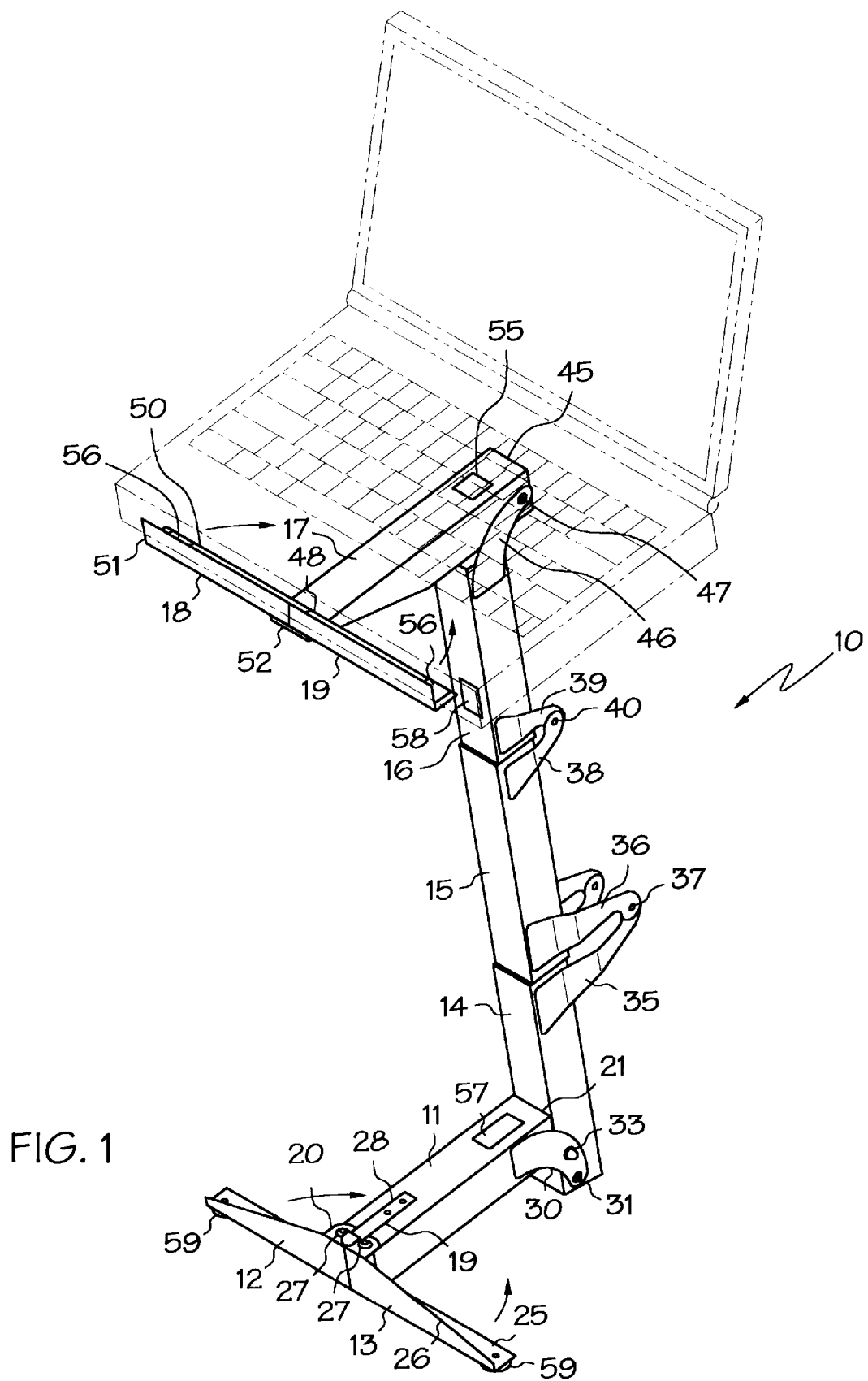
FIG. 1 is a perspective view of the portable stand of the invention with a laptop computer shown in phantom resting on the stand ready for use.
Figure 2:
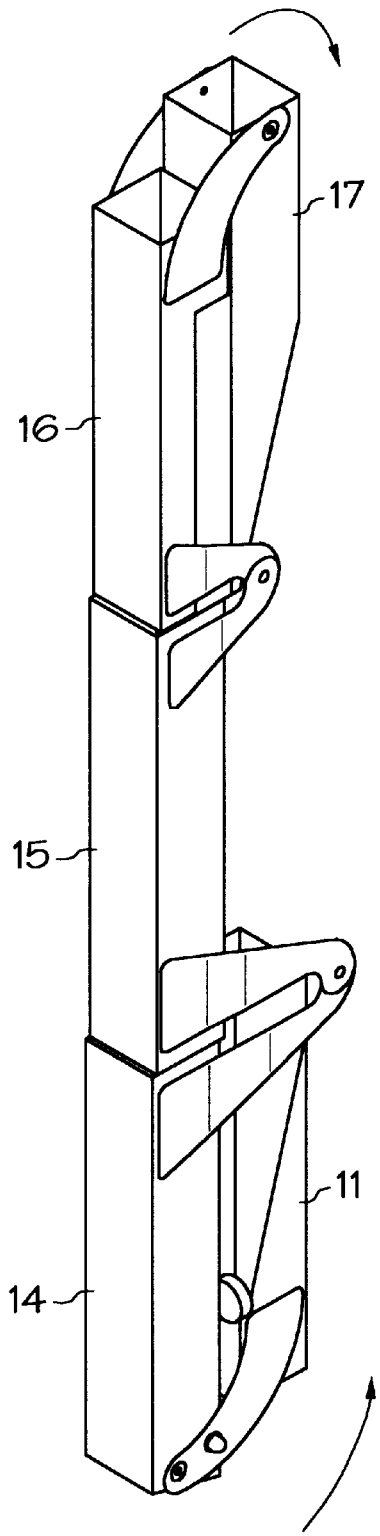
FIG. 2 is a perspective view of the portable stand of FIG. 1 in a partially folded state.
Figure 3:
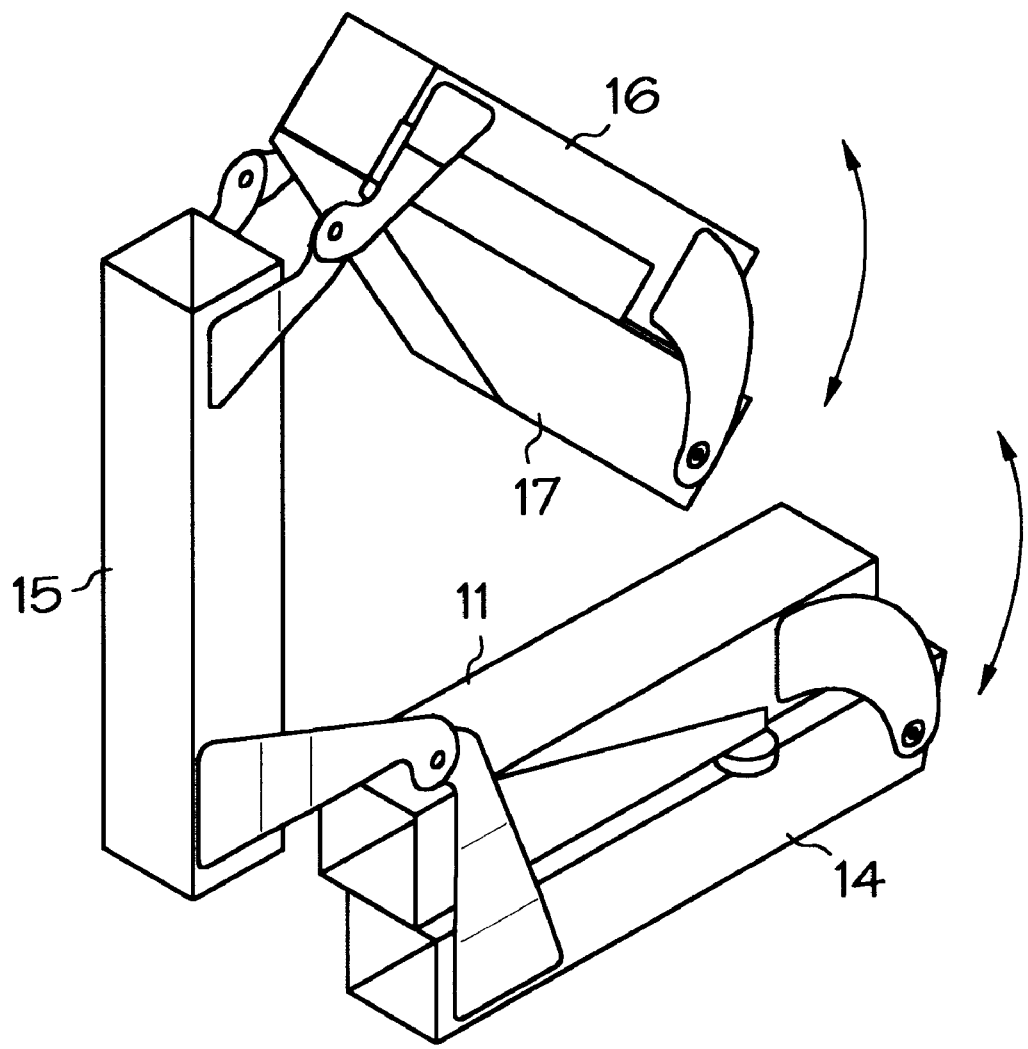
FIG. 3 is a perspective view of the portable stand of FIG. 1 in a partially, though, more advanced folded state than in FIG. 2.
Figure 4:
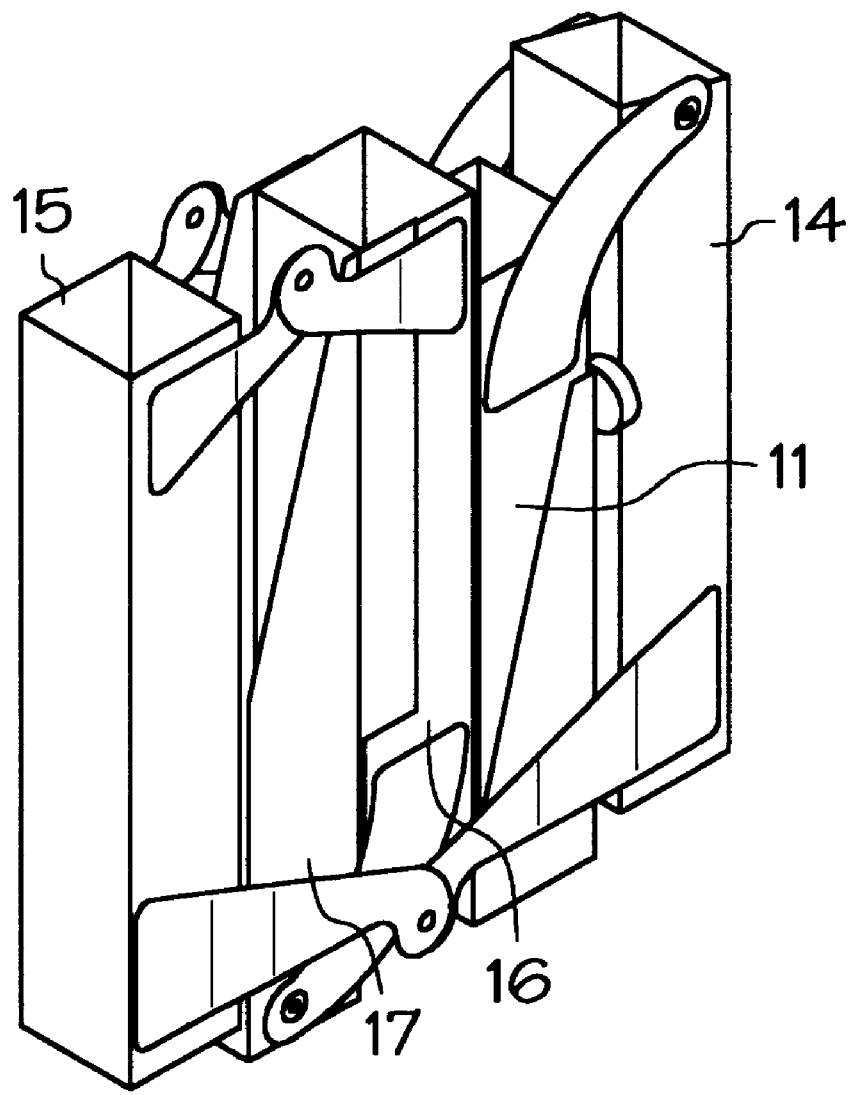
FIG. 4 is a perspective view of the portable stand of FIG. 1 in a fully folded compact state ready for storage.

With respect to FIG. 1, there is shown a portable stand 10 of the invention in a fully erect position to receive a laptop computer. The portable stand 10 includes as its essential components an elongated base member 11 with base feet 12 and 13, a lower post member 14, a middle post member 15, an upper post member 16 and an elongated platform member 17 with support wings 18 and 19. FIGS. 2 and 3 illustrate the portable stand 10 in different stages of being folded until it is in a fully folded state illustrated in FIG. 4. Each of the individual components and their interactions are described below.

As evident in FIG. 1, the elongated base member 11 with its pair of base feet 12 and 13 and a terminus of the lower post member 14 form a floor-engaging foundation for the portable stand 10. The elongated base member 11 has four faces, each of which is rectangular-shaped. A cross-section of the base member 11 when taken in a direction normal to a longitudinal axis of the base member is square. The base member is preferably hollow for weight and cost of production saving purposes. Additionally, the hollow base member facilitates airport security checks. It is made of sheet metal, though can be made of any other rigid material including aluminum and plastic. The base member preferably is about seven inches to about nine inches in length with a distal end and a proximal end 21.

The base feet 12 and 13 are pivotally attached to the distal end of the elongated base member 11. Each base foot preferably has a length of from about five inches to about seven inches with a L-shape cross-section. The base feet 12 and 13 each has a bottom horizontally extending ledge and a side vertically extending ledge 26. The feet are attached to the elongated base member 11 to cause the bottom ledge of each base foot to slide under a bottom face of the elongated base member and the side ledge of each base foot to lie adjacent a side face of the elongated base member when closed. The L-shaped configuration of the base feet are conducive to a low profile when folded to lie juxtaposed the base member during non-use.

Further, the base feet 12 and 13 are attached with pivot pins 27 to the elongated base member 11. Other means of pivotally attaching the base feet to the elongated base member are possible. With reference to FIG. 1, a keeper plate 28 is provided to lock the feet 12 and 13 into place during use. The keeper plate 28 is secured to the base member 11 at one end. A free end nearest the feet 12 and 13 is dimensioned to fit between heads of the pivot pins 27 pivotally holding the feet 12 and 13 to the base member 11. Further, the free end of the keeper plate is offset upwardly from the balance of the keeper plate to interlock with the pivot pin heads. There is sufficient give in the free end to allow the user to pull upwardly on the keeper plate's free end to release the feet and fold them inwardly when desired. While not required, the keeper plate 28 is highly preferred to ensure that the portable stand remains upright during use.

The proximal end 21 of the elongated base member is pivotally attached to the lower post member 14. An arch-shaped pivot arm 30 is immovably attached to the base member 11 and pivotally attached to a lower end of the lower post member 14 by a pivot pin 31. A second arch-shaped pivot arm 32 is attached in the same manner to an opposite face of the base member 11 and lower post member 14. Preferably, to add stability, a keeper button 33 is operably associated with the first arch-shaped pivot arm 30 and lower post member 14. The keeper button 33 is a spring-loaded rod extending from inside the lower post member 14 through a hole in the pivot arm 30 and in effect acts to rigidly hold the lower post member 14 to the base member 11. To fold the portable stand as described in detail below, the keeper button 33 is depressed so that it clears the hole in the pivot arm 32. This allows the base member 15 11 to rotate about the pivot pin 31 of the first pivot arm 30 and move about 270 degrees to juxtaposed the lower post member 14.

Each of the arch-shaped pivot arms 30 and 32 is dimensioned and positioned so that the proximal terminus of the base member 11 fully contacts a front face of the lower post member 14. As such the elongated base member 11 forms a right angle with the lower post member 14. At the same time, the lower post member and other post members extend at an angle of from about eight degrees to about twelve degrees, preferably about nine degrees to about ten degrees, from the vertical. Contact by the proximal terminus on the front face of the lower post member about one inch to about two inches from the lower post member's terminus results in the desired tilt. The resultant tilt is desired for stability purposes and ease of use purposes. The post members extending at the stated angle from the vertical draws the platform member into the lap of the user to facilitate operation of the laptop computer. That is, the user can operate the computer at an ergonomically correct position. Additionally, the posts extending at the aforementioned angle from the vertical results in the platform member 17 and support wings 18 and 19 tilting downwardly. The downward tilt is preferred to better retain the laptop computer and present the computer's display screen at a desired angle for the user.

The lower post member 14, middle post member 15 and upper post member 16 are substantially equal in length and cross-sectional shape primarily for appearance purposes. Each has four rectangular-shaped faces at right angles to one another and form a square cross-section when viewed normal to a longitudinal axis of each post. The length of each is based on the average desired stand height of about two feet. Accordingly, each post preferably has a length of from about eight inches to about nine inches. All are preferably hollow for the same reasons given above with respect to the elongated base member.

The lower post member 14 and middle post member 15 are hingeably attached together by the use of two hinge halves 35 and 36 and a pivot pin 37. A first hinge half 35 is immovably secured to the lower post member 14 near its terminus and the second hinge half 36 is immovably secured to the middle post member near its terminus. The pivot pin 37 connects the two hinge halves together to allow the two posts to rotate about one another. In a similar manner, the middle post member and the upper post member 16 are hingeably connected by hinge halves 38 and 39 and a pivot pin 40. As evident in FIG. 3, each post can rotate about its pivot pin and lie flat on an adjacent post.

Hinge halves which are used to connect the post members 14–16 together are all permanently secured to the post members. Each set of hinge halves together with a pivot pin allows the connected post members to revolve about 180 degrees from a straight configuration to a stacking configuration. Preferably, each hinge half is offset outwardly at an about mid-point to enhance the stacking configuration and also add a further measure of stability to post members of the portable stand.

The laptop computer used with the portable stand 10 of the invention rests on the elongated platform member 17 and support wings 18 and 19. The platform member 17 preferably has a length of from about eight inches to about nine inches and a square cross-section when viewed normal to its longitudinal axis. It is also hollow for the reasons given above with respect to the elongated base member. The platform member 17 is pivotally attached at a proximal end 45 to the upper post member 16. A pivot arm 46 is immovably attached to each side of the upper post member 16 and the pivot arms are pivotally attached by a pivot pin 47 to the platform member 17.

A pair of support wings 18 and 19 are pivotally attached to a distal end 48 of the platform member 17. Each support wing is L-shaped with a bottom horizontally extending ledge 50 serving as a rest surface for the laptop computer and a side vertically extending ledge 51 serving as a retainer surface for the computer. Each support wing moves from a position juxtaposed the support wing about 90 degrees to extend at a substantial right angle from the platform member 17. While not required, a reinforcing plate 52 is secured on the underside of the platform member 17 at its distal end 48 to underlie the support wings 18 and 19. The plate 52 is secured to the platform member 17 by the two pivot pins holding the support wings in place. The broad flat surface of the platform member 17 and the two support wings 18 and 19 provide a surface for the laptop computer.

The portable stand includes optional features which enhance its use. As best seen in FIG. 1, hook or loop fasteners 55 and 56, better known as Velcro fasteners, are placed on the top surfaces of the platform member 17 and the support wings 18 and 19. Preferably, the fastener 55 is placed near the proximal end 45 of the platform member 17 and the fasteners 56 are placed near the outer extremities of the support wings 18 and 19. Mating hook or loop fasteners are placed on the underside of the main body of the laptop computer so as to be aligned with the hook and loop fasteners on the support stand. The fasteners help to retain the computer in place while in use. Other fasteners which semi-permanently hold the laptop computer to the portable stand, yet readily release it can be used. For example, double sided tape is feasible.

Still with reference to FIG. 1, there are provided optional hook or loop fasteners 57 on a top face near the proximal end 21 of the base member 11 and a mating hook or loop fastener 58 on a front face near a lower terminus of the upper post member 16. As more evident in FIG. 3, the hook or loop fasteners contact one another when the base member 11 and upper post member 16 are brought into contact during a folding operation. The fasteners temporarily help to hold the folded portable stand together. Other fasteners or holding means can as well be used to temporarily hold the folded portable stand in a compact state.

Still other features can be included on the portable stand of the invention which enhance its use, appearance and/or durability. For example, foot pads can be added on the bottom surface of the base feet to prevent marring or other damage to a floor surface. FIG. 1 shows foot pads 59 at the extremities of the base feet. Bushings can be used with the pivot pins for smooth component movements. Plastic caps can be positioned over one or more terminuses of the elongated base member, post members and platform member to improve appearance and eliminate rough surfaces created during manufacturing. Still other structural components such as snap buttons and lock pins can be added.

FIGS. 1–4 show the operation of the portable stand of the invention. As seen in FIG. 1, the stand is fully erect and capable of holding a laptop computer. To fold the stand to a compact state and still with reference to FIG. 1, initially the base feet and the support wings are folded inwardly towards the base member and the platform member, respectively until each lies flush therewith. Next, as seen in FIG. 2, the base member 11 with its base feet is folded about 270 degrees inwardly towards the lower post member 14. Also and still with reference to FIG. 2, the platform member 17 with its support wings is folded about 270 degrees inwardly towards the upper post member 16. The base member and support member are juxtaposed the posts. With reference to FIG. 3, the upper post member 16 and associated platform member 17 are folded about 180 degrees inwardly towards the middle post member 15. Finally, the lower post member 14 and the associated base member 11 are folded about 180 degrees inwardly towards the middle post member to form the compact article depicted in FIG. 4.

Figure 5:
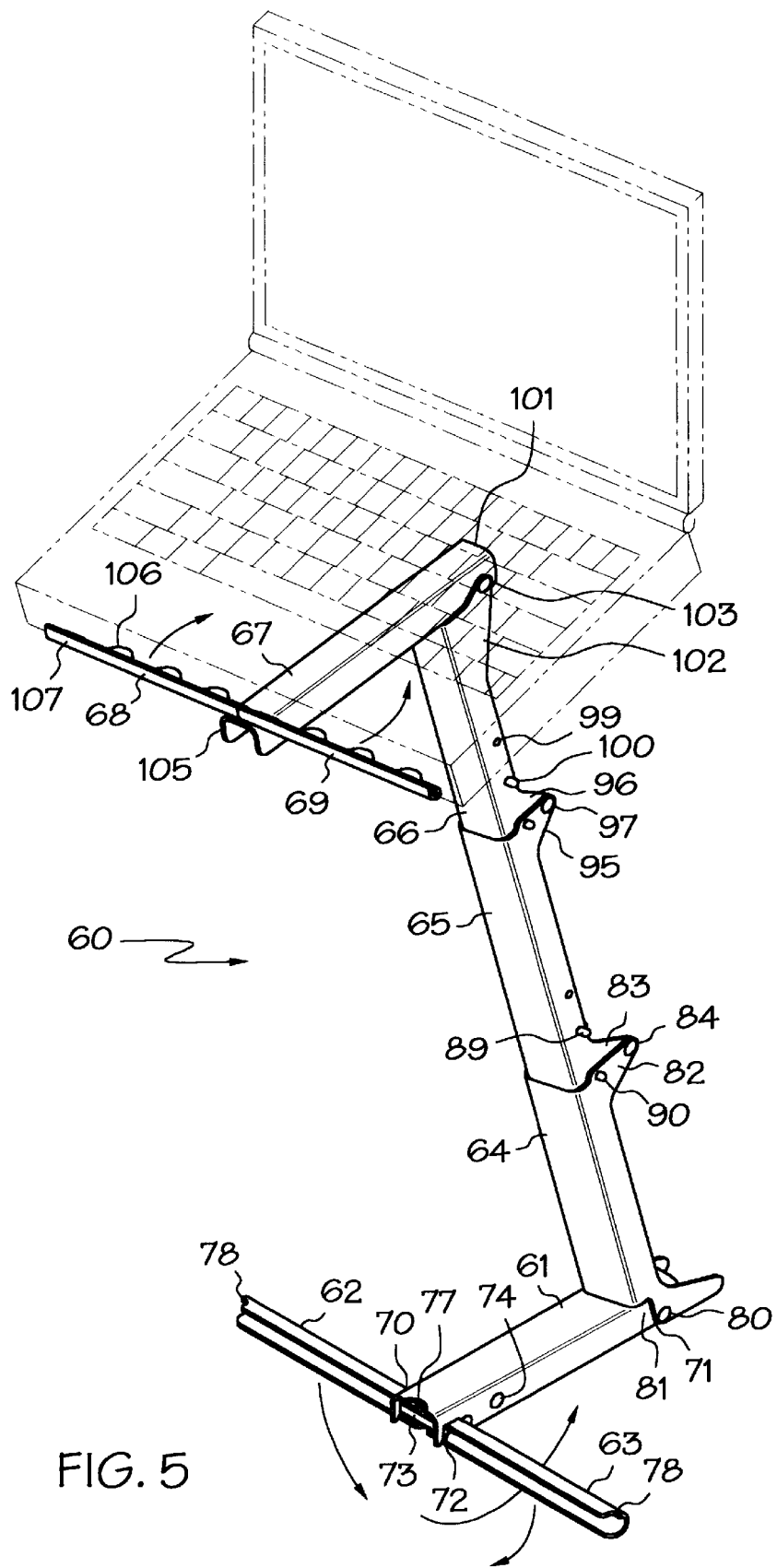
FIG. 5 is a perspective view of another portable stand of the invention with a lap top computer shown in phantom resting on the stand ready for use.
Figure 6:
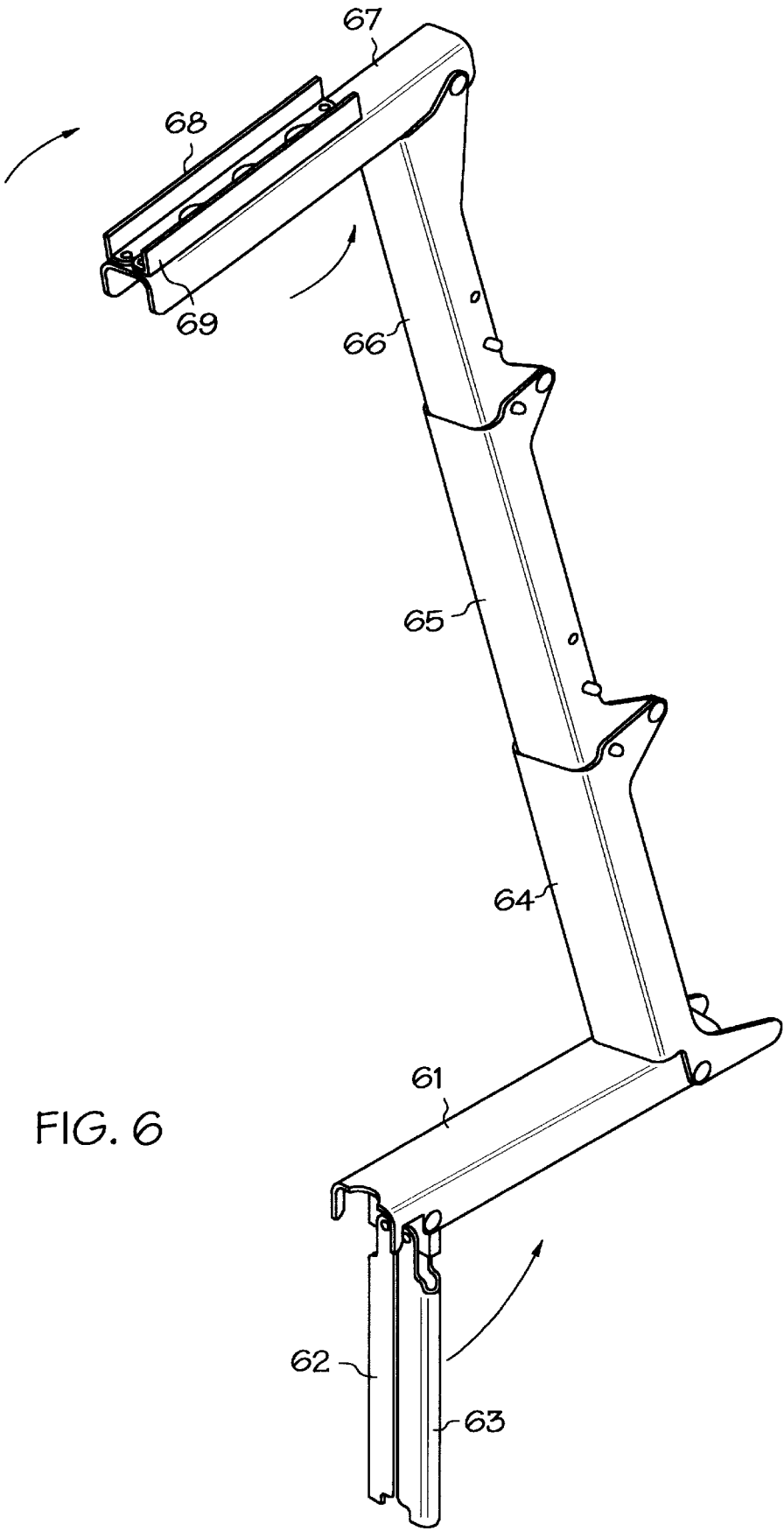
FIG. 6 is a perspective view of the portable stand of FIG. 5 in an initial stage of being folded together.
Figure 7:
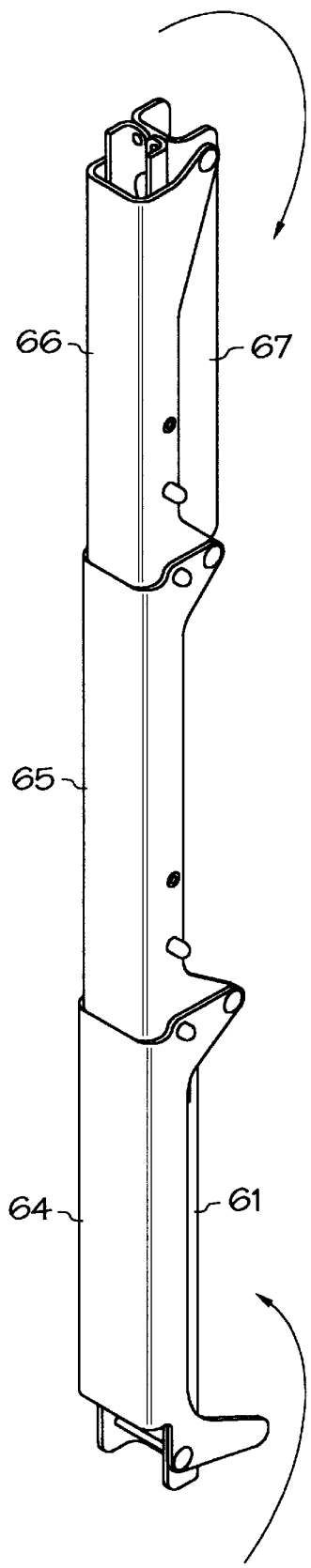
FIG. 7 is a perspective view of the portable stand of FIG. 5 in a partially folded state.
Figure 8:
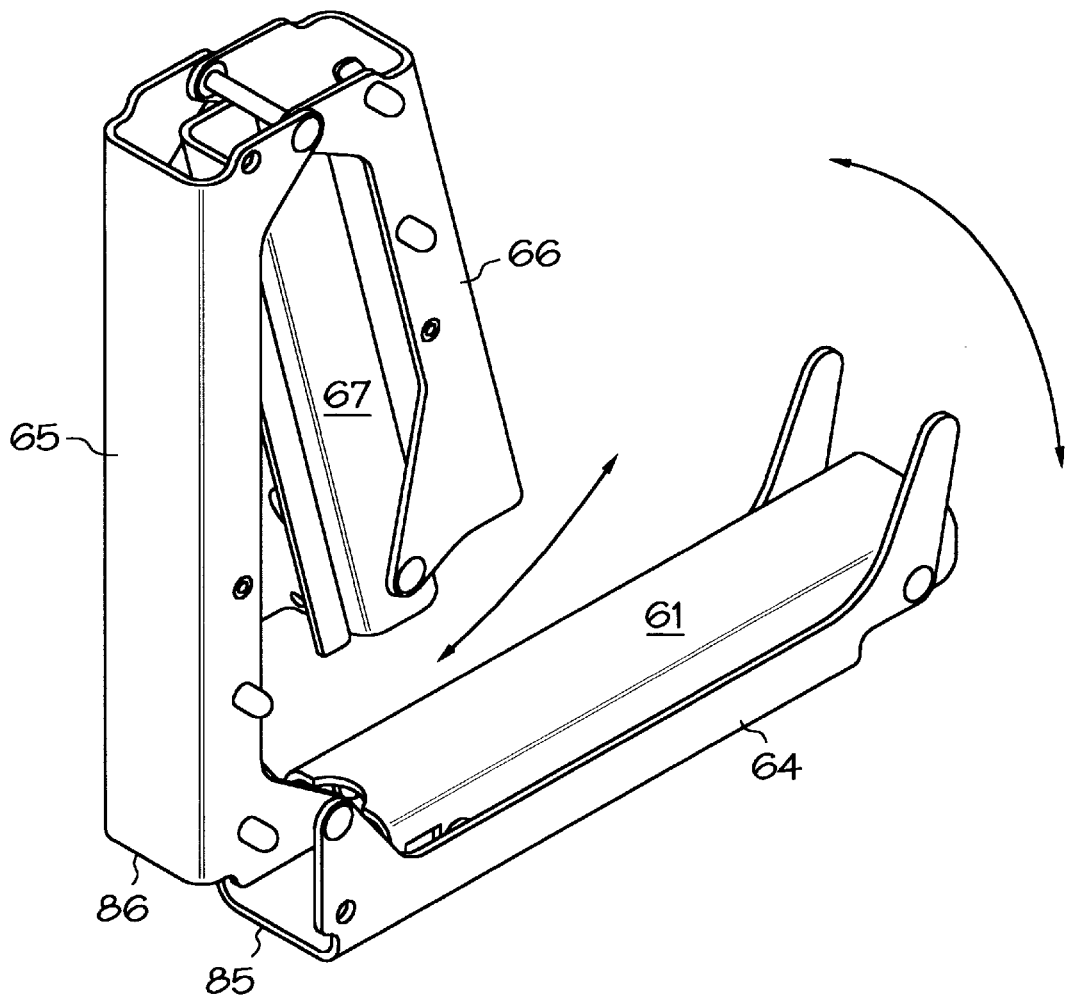
FIG. 8 is a perspective view of the portable stand of FIG. 5 in a partially, though more advanced folded state than in FIG. 7.
Figure 9:
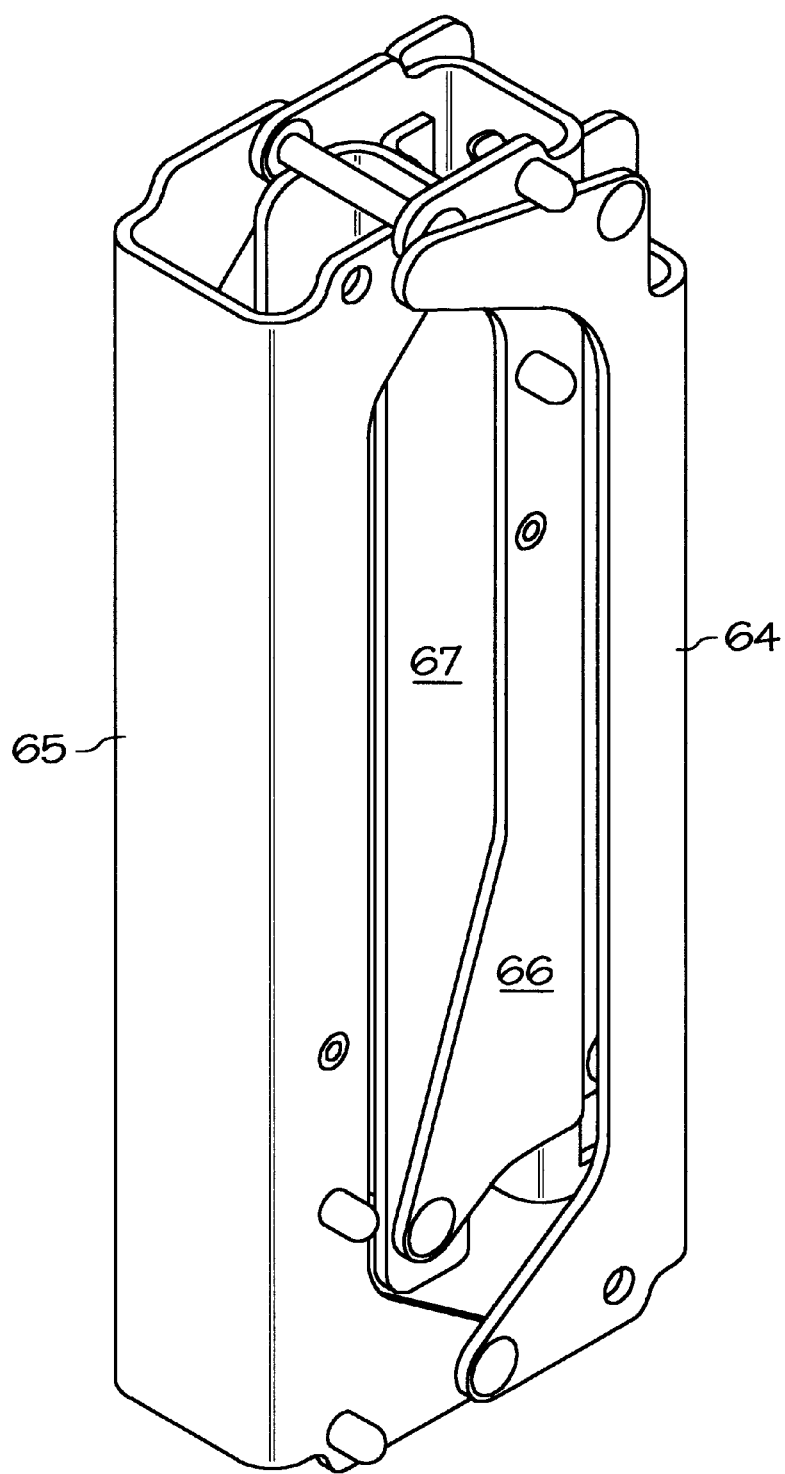
FIG. 9 is a perspective view of the portable stand of FIG. 5 in a fully folded compact state ready for storage.

FIGS. 5–13 illustrate a preferred embodiment of the invention. As best seen in FIG. 5, a portable stand 60 includes an elongated base member 61 with base feet 62 and 63, a lower post member 64, a middle post member 65, an upper post member 66 and an elongated platform member 67 with support wings 68 and 69. FIGS. 6, 7 and 8 show the portable stand 60 in the process of being folded. FIG. 9 shows the portable stand 60 in a fully folded state.

As evident in FIG. 5, the elongated base member 61 of the portable stand 60 together with the base feet 62 and 63, when fully extended away from the base member 61, form a floor-engaging foundation. The base member 61 preferably is about seven inches to about nine inches in length with a distal end 70 having the base feet 62 and 63 attached thereto and a proximal end 71 attached to the lower post member 64. The elongated member 61 has an inverted U-shape when viewed in a direction normal to a longitudinal axis. A cavity formed by a top wall and two sidewalls of the base member 61 receive and hold the base feet 62 and 63 when the feet are swung inwardly as when the portable stand 60 is folded to a compact state as evident in FIG. 6. Necessarily, the base feet 62 and 63 preferably are about five inches to about seven inches in length to fit within the cavity.

Figure 12:
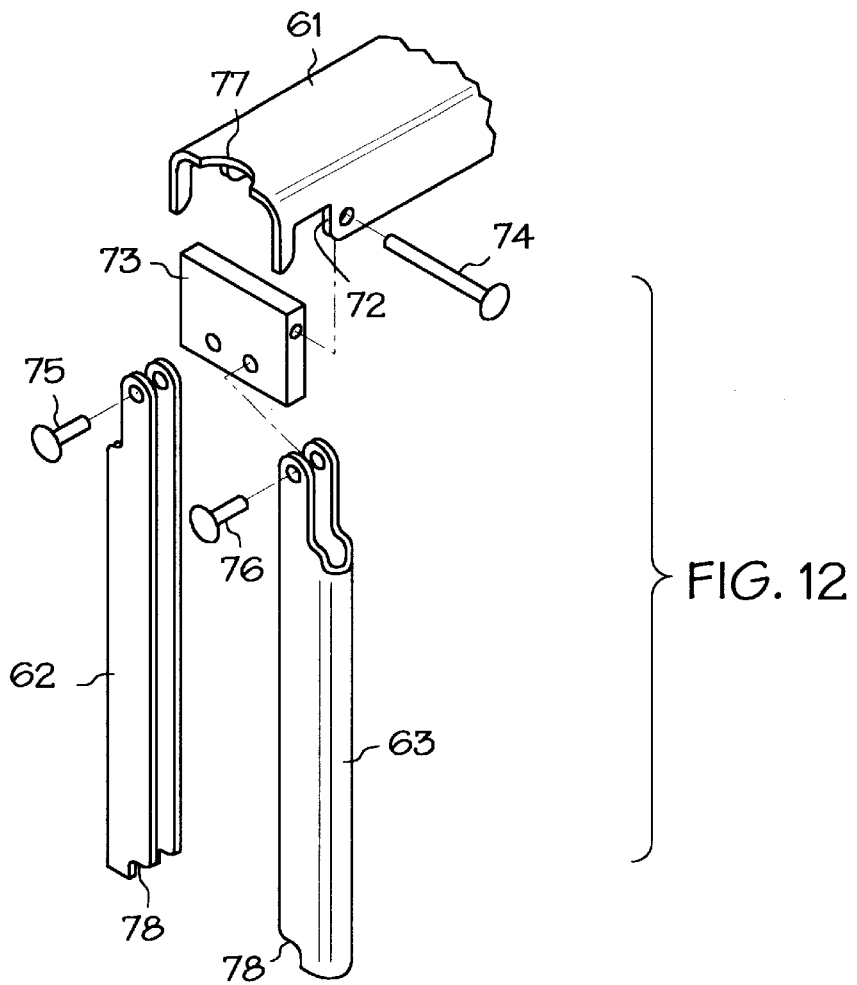
FIG. 12 is an exploded view in perspective of an attaching means for the base feet of the portable stand of FIG. 5.
Figure 13:
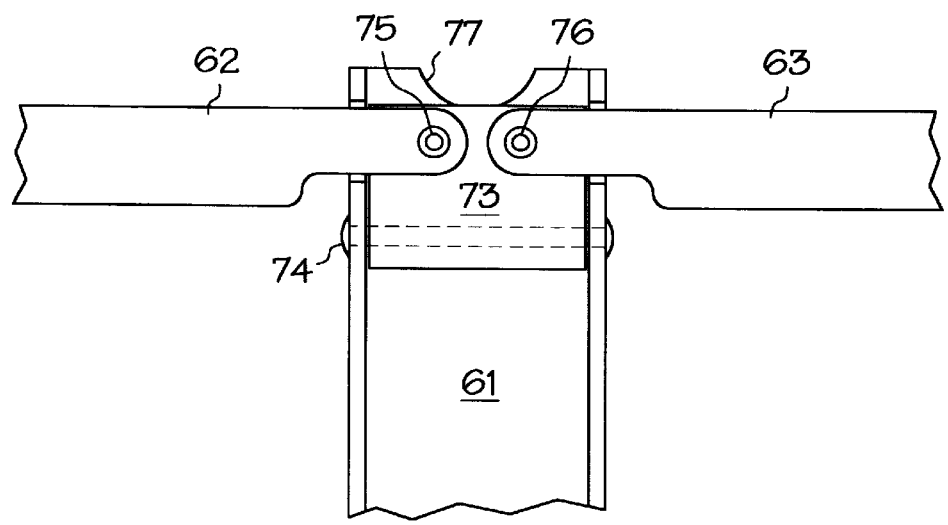
FIG. 13 is a partial bottom plan view of the portable stand of FIG. 5 showing the attaching means for the base feet.

The elongated base member 61 has a notch 72 in each sidewall near the base member's distal end. The notches 72 extend vertically upwardly. The notches 72 are to accommodate the base feet 62 and 63 when the base feet as fully extended. This allows the bottom surfaces of the base feet to lie in substantially the same plane as the bottom surface of the base member. As seen in FIGS. 6, 12 and 13 the base feet 62 and 63 are moveably attached to the elongated base member 61 by a pivot plate 73 and a pivot pin 74. The pivot pin 74 is attached to each of the two sidewalls of the base member 61 near the notches 72 and extends through the pivot plate 73 near an edge thereof. The base feet 62 and 63 in turn are pivotally attached to the pivot plate 73 by vertically extending pivot pins 75 and 76, respectively. As should be evident, the base feet 62 and 63 together with the pivot plate 73 move about 90 degrees within the notches 72 to clear the notch walls of the base member 61. The base feet 62 and 63 then pivotally move until together in a side-by-side relationship. Lastly, the base feet 62 and 63 pivotally move along with the pivot plate 73 until fully within the elongated base member's cavity to effectively disappear for storage purposes. When the portable stand 60 is to be used, the base feet 62 and 63 are pulled from the cavity, pivotally moved away from one another until they essentially form a straight line, and then the pivot plate 73 pivotally moved about ninety degrees so that the base feet fit into the notches 72. The base feet are stabilized when fully extended by being trapped within the notches 72.

While optional, though highly preferred for ease of use, the elongated base member 61 has a cut-out 77 at its proximal end in its top wall and the base feet 62 and 63 each has a cut-out 78 in a top wall at its outer terminus. The cut-outs serve as finger grips for grasping and pulling the components apart in erecting the portable stand from its fully folded compact state.

The lower post member 64, middle post member 65 and upper post member 66 are substantially equal in length. Each has a U-shape when viewed normal to a longitudinal axis. Additionally, each U-shape post member is progressively smaller in width from the lower post member to the upper post member to allow a nesting configuration in a folded state as further discussed below. Further, airport security checks are facilitated by the open structure nature of portable stand and its components. The length of each post member preferably is about eight inches to about nine inches.

A pivot pin 80 extends through sidewalls of the lower post member 64 at a lower terminus. Each sidewall has a cut-out 81 at its lower terminus to allow the lower post member 64 to pivotally move about its pivot pin 80 and rest upon the top surface of the elongated base member 61. The configurations of the elongated base member 61 and lower post member 64 and the pivotable attachment allows the base member to swing about 270 degrees from a folded compact state to a fully extended use state. If needed, recesses in the inner sidewalls of the lower post member 64 near an upper terminus can be added to accommodate the pivot pin 74 when the elongated base member 61 is swung into the cavity of the lower post member 64.

The lower post member 64 extends at an angle of from about eight degrees to about twelve degrees from the vertical. Preferably, the lower post member extends from about nine degrees to about ten degrees from the vertical to result in a stand which allows an ergonomically correct use of a laptop computer positioned on the stand as discussed above with respect to the portable stand 10.

The lower post member 64 is pivotally attached to the middle post member 65. For this purpose, flanges 82 extend from an upper terminus of the lower post member 64. Also, flanges 83 extend from a lower terminus of the middle post member 65. The flanges 82 and 83 are pivotally joined together by a pivot pin 84 which extends through an outer portion of each flange. When the portable stand 60 is erected, the terminus of the front walls of lower post member 64 and the middle post member 65 preferably abut for added stability. For this reasons and with reference to FIG. 8, a cut-out 85 in the lower post members upper front terminus and a cut-out 86 in the middle post lower front terminus are created.

Figure 10:
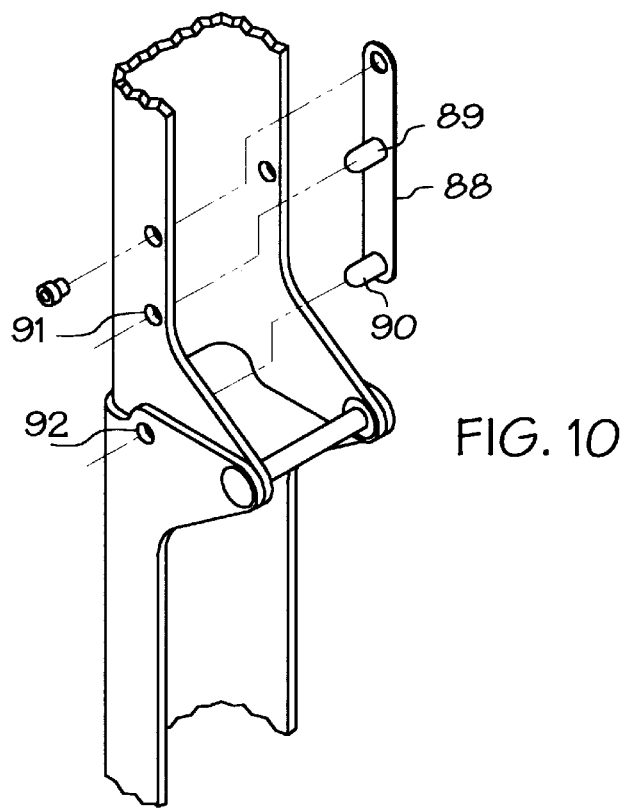
FIG. 10 is a partial view of an inside of the portable stand of FIG. 5 showing a locking means for the post members.
Figure 11:
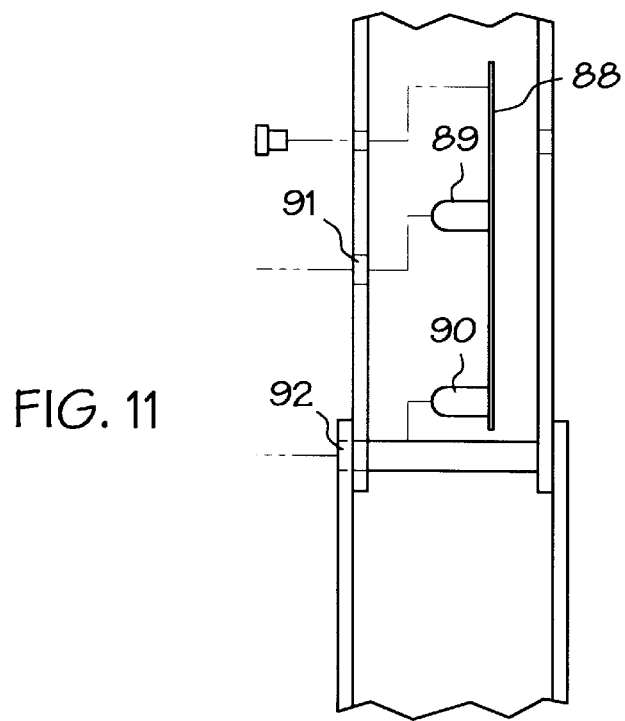
FIG. 11 is a partial back view in elevation showing the locking means of FIG. 10.

Optionally, though highly preferred, and with reference to FIGS. 10 and 11 a keeper plate 88 with push buttons 89 and 90 is used to rigidly hold the middle post member 65 to the lower post member 64. The keeper plate 88 is an elongated flat member which is permanently attached at one end to an inside sidewall of the middle post member 65. A free end of the keeper plate 88 extends past the middle post's terminus and into the upper terminus area of the lower post member 64. A hole 91 is provided in the middle post sidewall to accommodate the push button 89. Aligned holes 92 and extend through a sidewall of the middle post member lower terminus and through the sidewall of the lower post member upper terminus to accommodate the push button 90. When the push button 90 is fully extended through the holes 92, the middle and lower post members are locked together. When the push button 90 is forced inwardly to clear at least the hole 92 in the middle post member, the two post members are free to move relative to one another.

The middle post member 66 is pivotally attached to the upper post member 65 in a similar fashion. The middle post member has flanges 95 extending from its upper terminus. Also, flanges 96 extend from a lower terminus of the upper post member 66. The flanges 95 and 96 are pivotally joined together by a pivot pin 97. The pivot pin 97 extends through an outer portion of each flange. Similar to the cut-outs 85 and 86 in the lower post member and middle post member abutting terminus, cut-outs are also provided in front wall terminuses of the middle post member and upper post member to allow the front walls of the two post member to abut against each other. Optionally, though highly preferred, another keeper plate with push buttons 99 and 100 as seen in FIG. 5 is used to rigidly hold the upper post member 66 to the middle post member 65. The keeper plate and push buttons 99 and 100 are identical is structure and function to the keeper plate 88 and push buttons 89 and 90 described above.

The elongated platform member 67 of the portable stand 60 preferably has a length of from about eight inches to about nine inches. It has an inverted U-shape when viewed normal to its longitudinal axis. It is pivotally attached at a proximal end 101 to the upper post member 66. For this purpose, the upper post member has a set of flanges 102 at its upper terminus. The flanges 102 extend above the top wall terminus of the upper post member 66. A pivot pin 103 extends through a hole in a first flange 102, through holes in the sidewalls of the platform member 67, and through a hole in the second flange 102. The flanges 102 extend sufficiently far that the platform member 67 rests flat on the upper post member 66 terminus and extends at a substantially right angle from the upper post member 66. The platform member 67 is also capable of swinging about 270 degrees to lie within the cavity of the upper post member 66.

The support wings 68 and 69 are pivotally attached to the distal end 105 of the platform member 67. Each support wing is L-shaped with a bottom horizontally extending ledge 106 serving as a rest surface for the laptop computer and a side vertically extending ledge 107 serving as a retainer surface for the computer. The support wing 68 has a scalloped edge which meshes with a scalloped edge of the support wing 69. Each support wing moves from a position juxtaposed on top of the platform member 67 about 90 degrees to extend at a substantial right angle from the platform member 67.

Operation of the portable stand 60 is similar to operation of the portable stand 10. Initially, the base feet and associated pivot plate are rotated about 90 degrees. The base feet are then pivotally moved about 90 degrees to lie side-by-side. They, together with the pivot plate are now rotated until they fit within the cavity of the elongated base member. Separately, the support wings are pivotally moved towards one another until both are juxtaposed one another and juxtaposed the platform member. The platform member with its support wings are now pivotally moved until it rests within the cavity of the upper post member. The keeper buttons are next depressed first to allow the upper post member to pivotally move into the cavity of the middle post member and second to allow the lower post member to pivotally move so as to overlie the upper post member.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A portable stand for holding a laptop computer which is stable in use and foldable to a compact state for easy storage, comprising:

(a) an elongated base member having a distal end and a proximal end;

(b) a pair of base feet moveably attached to the elongated base member at the distal end thereof to swing substantially horizontally from a position juxtaposed said elongated base member to a position extended at substantially right angles to the elongated base member;

(c) a lower post member moveably attached to the proximal end of the base member to swing substantially vertically from a position juxtaposed the elongated base member to a position at a substantially right angle to the elongated base member;

(d) a middle post member moveably attached to the lower post member to swing substantially vertically from a position juxtaposed the lower post member to a position extending substantially straight from the lower post member and in the same plane thereof;

(e) an upper post member moveably attached to the middle post member to swing substantially vertically from a position juxtaposed the middle post member to a position extending substantially straight from the middle post member and in the same plane thereof;

(f) an elongated platform member having a proximal end and a distal end wherein said elongated support member is pivotally attached at its proximal end to the upper post member to swing substantially vertically from a position juxtaposed the upper post member to a position at a substantial right angle to the upper post member; and (g) a pair of support wings moveably attached to the elongated platform member at its distal end thereof to swing substantially horizontally from a position juxtaposed said elongated support member to a position extending at substantially right angles to the elongated platform member whereby the support wings extend outwardly and together with the elongated platform member provide a stable support surface to hold the laptop computer for use and whereby the base feet and support wings fold inwardly and the post members all fold together to a compact state.

2. The portable stand of claim 1 wherein the lower post member extends at an angle from about eight degrees to about twelve degrees from the vertical.

3. The portable stand of claim 2 wherein the elongated base member has four rectangular-shaped faces at right angles to one another and has a substantially square cross-section when viewed in a direction normal to its longitudinal axis.

4. The portable stand of claim 3 wherein each of the base feet is L-shaped with a bottom ledge and a side ledge whereby the lower ledge lies under the bottom face of the elongated base member and the side ledge lies adjacent the side face of the elongated base member when in the juxtaposed position.

5. The portable stand of claim 4 further wherein a keeper plate locks the base feet in position relative to the elongated base member during use.

6. The portable stand of claim 2 wherein the elongated base member is pivotally connected to the lower post member by a pivot arm wherein one end of said pivot arm is immovably secured to the elongated base member and the other end of said pivot arm is connected to the lower post member by a pivot pin.

7. The portable stand of claim 6 further wherein a second pivot arm is immovably secured to the elongated base member and pivotally connected to the lower post member by a keeper button, said keeper button being spring-loaded and extending from the lower post member through a hole in the pivot arm to lock the elongated base member to the lower post member when the portable stand is erected.

8. The portable stand of claim 2 wherein the lower post member, middle post member and upper post member all have substantially the same length and same cross-section when viewed in a direction normal to their longitudinal axes.

9. The portable stand of claim 8 wherein each post member is hingeably connected to another post member by two sets of hinge halves, each of which is immovably secured to a post member and a pivot pin is operably associated with each hinge half.

10. The portable stand of claim 9 wherein each hinge half is outwardly offset to provide clearance for the post members to fold unto themselves.

11. The portable stand of claim 2 wherein the elongated support member is pivotally attached to the upper post member by a pivot arm, with one end of said pivot arm immovably attached to the upper post member and another end of said pivot arm pivotally attached to the elongated support member by a pivot pin.

12. The portable stand of claim 11 further wherein the support wings are L-shaped with a bottom ledge to hold the laptop computer and a side ledge to retain the laptop computer in place.

13. The portable stand of claim 1 further having a first fastener on the upper post member and a second mating fastener on the elongated base member and in alignment with one another to mate when the portable stand is collapsed to a compact state whereby said fasteners help to keep the collapsed portable stand in the compact state.

14. A portable stand for holding a laptop computer which is stable in use and foldable to a compact state for easy storage, comprising:

(a) an elongated base member having a distal end and a proximal end;

(b) a pair of L-shaped base feet each having a bottom horizontally extending ledge and a side vertically extending ledge and further each base foot pivotally attached to the elongated base member at its distal end thereof to swing substantially horizontally from a position juxtaposed said elongated base member where the lower ledge of each base foot lies under the elongated base member to a position extending at substantially right angles to the elongated base member;

(c) a lower post member pivotally attached to the proximal end of the base member to swing substantially vertically from a position juxtaposed the elongated base member to a position at a substantially right angle to the elongated base member whereby the proximal end of the elongated base member contacts a sidewall of the lower post member to create an about eight degree to about twelve degree angle to the vertical;

(d) a middle post member hingeably attached to the lower post member to swing substantially vertically from a position juxtaposed the lower post member to a position extending substantially straight from the lower post member and in the same plane thereof;

(e) an upper post member hingeably attached to the middle post member to swing substantially vertically from a position juxtaposed the middle post member to a position extending substantially straight from the middle post member and in the same plane thereof;

(f) an elongated platform member having a proximal end and a distal end wherein said elongated support member is pivotally attached at its proximal end to the upper post member to swing substantially vertically from a position juxtaposed the upper post member to a position at a substantial right angle to the upper post member; and (g) a pair of L-shaped support wings each having a bottom ledge and a side ledge and each said support wings pivotally attached to the elongated platform member at a distal end thereof to swing substantially horizontally from a position juxtaposed said elongated support member to a position extending at substantially right angles to the elongated platform member whereby the support wings extend outwardly and together with the elongated platform member provide a stable support surface to hold the laptop computer for use and whereby the base feet and support wings fold inwardly and the post members all swing together to a compact state.

15. The portable stand of claim 14 wherein the lower post member extends from the elongated base member at an angle of from about eight degrees to about twelve degrees from the vertical when said portable stand is used.

16. A portable stand for holding a laptop computer which is stable in use and foldable to a compact state for easy storage, comprising:
   (a) an elongated base member having a distal end and a proximal end;
   (b) a pair of base feet with each said base foot pivotally attached to the elongated base member at said base member's distal end thereof to move from a position juxtaposed said elongated base member to a position extending at substantially right angles to the elongated base member;
   (c) a lower post member pivotally attached to the proximal end of the base member to swing substantially vertically from a position juxtaposed the elongated base member to a position at a substantially right angle to the elongated base member whereby the proximal end of the elongated base member contacts a top wall of the lower post member to create an about eight degree to about twelve degree angle to the vertical;
   (d) a middle post member pivotally attached to the lower post member to swing substantially vertically from a position juxtaposed the lower post member to a position extending substantially straight from the lower post member and in the same plane thereof;
   (e) an upper post member pivotally attached to the middle post member to swing substantially vertically from a position juxtaposed the middle post member to a position extending substantially straight from the middle post member and in the same plane thereof;
   (f) an elongated platform member having a proximal end and a distal end wherein said elongated support member is pivotally attached at its proximal end to the upper post member to swing substantially vertically from a position juxtaposed the upper post member to a position at a substantial right angle to the upper post member; and
   (g) a pair of L-shaped support wings each having a bottom ledge and a side ledge and each said support wing pivotally attached to the elongated platform member at a distal end thereof to swing substantially horizontally from a position juxtaposed said elongated support member to a position extending at substantially right angles to the elongated platform member whereby the support wings extend outwardly and together with the elongated platform member provide a stable support surface to hold the laptop computer for use and whereby the base feet and support wings swing inwardly and the post members all swing together to a compact state for storage or transport.

17. The portable stand of claim 16 wherein the lower post member extends from the elongated base member at an angle of from about eight degrees to about twelve degrees from the vertical when said portable stand is used.

18. The portable stand of claim 17 further having a keeper plate with a first end and a second end wherein the first end is permanently attached to the middle post member and the second end extends past the lower terminus of the middle post member, further wherein the keeper plate has an upper push button and a lower push button operably associated with holes in sidewalls of the middle post member and the lower post member to rigidly hold together said middle and power post members.

19. The portable stand of claim 17 wherein the elongated base member has an inverted U-shape with a cavity and further wherein a pivot plate is pivotally attached to the elongated base member to move within the cavity of the base member and each of the base feet is pivotally attached to the pivot plate.

20. The portable stand of claim 19 wherein the post members become progressively smaller in width going from the lower post member to the upper post member.

* * * * *